United States Patent
Johnson et al.

(10) Patent No.: US 8,203,941 B2
(45) Date of Patent: Jun. 19, 2012

(54) VIRUS/WORM THROTTLE THRESHOLD SETTINGS

(75) Inventors: William R. Johnson, Meadow Vista, CA (US); Mauricio Sanchez, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2518 days.

(21) Appl. No.: 10/856,325

(22) Filed: May 28, 2004

(65) Prior Publication Data

US 2005/0265233 A1 Dec. 1, 2005

(51) Int. Cl.
*G06F 11/00* (2006.01)
*G06F 15/16* (2006.01)

(52) U.S. Cl. ......................... 370/230; 709/223
(58) Field of Classification Search .................. 370/230, 370/270, 468; 709/223
See application file for complete search history.

(56) References Cited

U.S. PATENT DOCUMENTS

| | | | | |
|---|---|---|---|---|
| 4,223,181 | A * | 9/1980 | Simeau | 381/98 |
| 5,557,742 | A * | 9/1996 | Smaha et al. | 726/22 |
| 5,638,490 | A * | 6/1997 | Eckert et al. | 706/4 |
| 5,991,266 | A * | 11/1999 | Zheng | 370/229 |
| 6,317,688 | B1 * | 11/2001 | Bruckner et al. | 701/213 |
| 6,622,135 | B1 * | 9/2003 | Imbert De Tremiolles et al. | 706/20 |
| 6,657,954 | B1 * | 12/2003 | Bird et al. | 370/229 |
| 6,789,203 | B1 * | 9/2004 | Belissent | 726/22 |
| 6,816,910 | B1 * | 11/2004 | Ricciulli | 709/237 |
| 7,028,179 | B2 * | 4/2006 | Anderson et al. | 713/154 |
| 7,032,023 | B1 * | 4/2006 | Barrett et al. | 709/225 |
| 7,142,508 | B2 * | 11/2006 | Tobagi et al. | 370/230 |
| 7,215,637 | B1 * | 5/2007 | Ferguson et al. | 370/230.1 |
| 7,234,161 | B1 * | 6/2007 | Maufer et al. | 726/12 |
| 7,308,715 | B2 * | 12/2007 | Gupta et al. | 726/23 |
| 7,370,357 | B2 * | 5/2008 | Sekar | 726/23 |
| 7,389,537 | B1 * | 6/2008 | Callon et al. | 726/22 |
| 7,415,722 | B2 * | 8/2008 | Tateoka | 726/12 |
| 7,433,455 | B1 * | 10/2008 | Oran | 379/201.01 |
| 7,464,410 | B1 * | 12/2008 | Halasz et al. | 726/23 |
| 7,484,011 | B1 * | 1/2009 | Agasaveeran et al. | 709/250 |
| 7,552,206 | B2 * | 6/2009 | Nikolayev et al. | 709/223 |
| 7,607,170 | B2 * | 10/2009 | Chesla | 726/22 |
| 7,681,235 | B2 * | 3/2010 | Chesla et al. | 726/23 |
| 7,734,776 | B2 * | 6/2010 | Boulanger et al. | 709/224 |
| 7,814,542 | B1 * | 10/2010 | Day | 726/22 |
| 7,836,496 | B2 * | 11/2010 | Chesla et al. | 726/13 |
| 8,019,866 | B2 * | 9/2011 | Tonnesen | 709/224 |
| 2002/0133586 | A1 * | 9/2002 | Shanklin et al. | 709/224 |
| 2003/0023733 | A1 * | 1/2003 | Lingafelt et al. | 709/229 |
| 2003/0046581 | A1 * | 3/2003 | Call et al. | 713/201 |
| 2003/0196095 | A1 * | 10/2003 | Jeffries et al. | 713/181 |

(Continued)

OTHER PUBLICATIONS

Using a Sectrum Analyzer to Accurately Detect Misuse of TCP Resources &Malicious Activity on Data Networks; A Chesla; 11 pages; 2004.*

(Continued)

*Primary Examiner* — William Deane, Jr.

(57) ABSTRACT

One embodiment disclosed relates to a network device that includes at least one port to connect to a network and at least one throttle that limits a rate of connections made from the device. An auto-adaptive thresholding mechanism determines a threshold for the throttle. The mechanism may be tunable to various aggressiveness levels. Another embodiment disclosed relates to a network apparatus including multiple ports capable of making connections and multiple throttle instantiations. Each throttle instantiation is associated with a port or group of ports. Threshold levels for each throttle instantiation are independently set. The ports may be physical ports or may be logical ports.

30 Claims, 5 Drawing Sheets

U.S. PATENT DOCUMENTS

| | | | |
|---|---|---|---|
| 2004/0083408 A1* | 4/2004 | Spiegel et al. | 714/43 |
| 2004/0098617 A1* | 5/2004 | Sekar | 713/201 |
| 2004/0103159 A1* | 5/2004 | Williamson et al. | 709/206 |
| 2004/0111531 A1* | 6/2004 | Staniford et al. | 709/246 |
| 2004/0146006 A1* | 7/2004 | Jackson | 370/230 |
| 2004/0162994 A1* | 8/2004 | Cohen et al. | 713/201 |
| 2004/0199793 A1* | 10/2004 | Wilken et al. | 713/201 |
| 2004/0221184 A1* | 11/2004 | Hellerstein et al. | 713/300 |
| 2004/0236963 A1* | 11/2004 | Danford et al. | 713/201 |
| 2004/0250124 A1* | 12/2004 | Chesla et al. | 713/201 |
| 2004/0250127 A1* | 12/2004 | Scoredos et al. | 713/201 |
| 2005/0111460 A1* | 5/2005 | Sahita | 370/395.3 |
| 2005/0195748 A1* | 9/2005 | Sanchez | 370/252 |

OTHER PUBLICATIONS

Implementing & Testing or Virus Throttle; Twycross & Williamson; 9 pages ; May 21, 2003.*

Throttling Viruses: Restricting Propagation to detect Malicious Mobile Code; Williamson; 7 pages; Jun. 17, 2002.*

DDOS Network Attack Recognition & Defense; Mirkovic; 28 pages; Jun. 23, 2002.*

Matthew M. Williamson, "Throttling Viruses: Restricting propagation to defeat malicious mobile code", Jun. 17, 2002, pp. 1-6.

Matthew M. Williamson, et al., "Virus Throttling", Virus Bulletin Ltd. Mar. 2003, pp. 8-11.

Joris De Schutter, et al., "Kalman Filters: A Tutorial", Jornal A, vol. 40 (4), Dec. 1999, pp. 52-59.

* cited by examiner

VIRUS/WORM THROTTLE THRESHOLD SETTINGS

BACKGROUND OF THE INVENTION

1. Field of the Invention

The present invention relates generally to computer networking and computer software.

2. Description of the Background Art

Virus throttling is a relatively new technique to contain the damage caused by fast-spreading worms and viruses. This technique is described in "Throttling Viruses: Restricting propagation to defeat malicious mobile code," by Matthew M. Williamson, HP Laboratories, HPL-2002-172, Hewlett-Packard Company, 2002 (hereinafter "the HP Labs report").

Rather than attempting to prevent a computing machine from becoming infected, virus throttling inhibits the spreading of the worm or virus from an infected machine. This reduces damage because the worm or virus is able to spread less quickly, and this also reduces the network traffic caused by such worms and viruses.

Virus throttling is particularly effective against fast-spreading worms or viruses, where signature-based approaches can be weak. A signature-based anti-virus approach may be thought of as a race between the virus and the virus signature. A vulnerable machine will be infected if the virus reaches it before the signature does, but it won't be infected if the signature reaches it first. Unfortunately, not only do modern viruses and worms typically spread quickly, but they also have a head start in the race as the result of the time it takes to generate the virus signature. In the case of fast-spreading viruses and worms, besides the infected machines being a problem, the network loading caused by the additional traffic generated by the virus can cause problems for other users of the network, not just for those users with infected machines.

Virus throttling is based on controlling an infected machine's network behavior, and so does not rely on details of the specific virus. In other words, a signature is not needed to implement virus throttling. Although virus throttling does not prevent infection in the first place, it helps to contain damage by restricting the spread of the virus. With such throttling, a virus or worm outbreak will grow less rapidly, and the network loading will be reduced. Further, by damping down the spread of the virus or worm, the throttling buys time for signature-based solutions to reach machines before the virus or worm.

Virus throttling relies on the difference in network behavior between a normal (uninfected) machine and an infected machine. A fundamental behavior of a virus is its replication and spreading to as many different machines as possible. For example, the Nimda worm typically makes about 300 to 400 connections per second and the SQLSlammer worm sends about 850 packets per second, both probing for vulnerable machines. Similarly, many email viruses send mail to all the addresses they can find. In contrast, uninfected machines do not normally exhibit this kind of behavior. Instead, normal machines tend to contact other machines at a much lower rate. In addition, normal machines also tend to contact the same machines repeatedly. The rate of connections to new machines from a normal machine is typically on the order of one connection per second for TCP/UDP connections and on the order of once every ten minutes for email.

A virus throttle acts as a rate limiter on interactions with new machines. The "interactions" may include, for example, the initiation of a TCP connection, or the sending of a UDP packet or email. A machine may be considered "new" if it has a different destination address compared to other recently contacted machines. The throttle serves to delay (not drop) those interactions with new machines that occur at a higher rate than that allowed by the throttling device. If a virus attempts to scan for vulnerable machines at a high rate (for example, 400 connections per second), the throttle can limit this to a much slower rate (for example, one connection per second). This will slow down the rate at which the virus can spread.

If the virus is attempting hundreds of new connections every second, and only one is being allowed, then the backlog of delayed connections will grow rapidly. It turns out that the length of this backlog is a reasonable indicator that a virus has infected the system. If such an infection is so indicated, then more drastic action may be taken (for instance, stopping the networking and alerting the network administrator). Thus, the throttle can slow down viruses until the viruses are detected, at which point further propagation may be stopped with further action. For rapidly spreading viruses, this process may take less than a second.

FIG. 1 is a schematic diagram depicting basic components of a virus throttle system 100. The throttle system 100 may be thought of as a rate limiter on connections to new hosts. Whenever a request 102 is made, the throttle system 100 checks to see whether the request is to a new host. This is done by comparing the destination of the request 102 with a list or "working set" 104 of recent connections. The length of this list (i.e. the number recent connections to unique hosts in the working set) may be varied to alter the amount of throttling applied by the system 100. For example, if the working set 104 included only one recent connection, then all requests other than consecutive connections to the same host will be considered as a connection to a "new" host.

If the host is considered as not new, then the request 102 is processed 106 normally. However, if the host is considered as new, then the request 102 is added to a delay queue 108 to await processing. The rate limiter 110 periodically pops a request off the delay queue 108 for processing 106. The periodicity may be determined by the expiration of a timeout as indicated by a clock 112. The rate limiter 110 not only releases the request at the head of the queue for processing 106, but it also releases any other requests in the queue to the same destination. In addition, the working set 104 is updated by removing a host from the working set and replacing it with the new destination.

As described above, the throttle system 100 implements a rate limit and delays new connections made at a higher rate than allowed. Because the new connections are delayed, rather than being dropped, if new connections are requested at a very high rate, the number of requests in the delay queue 108 will mount up quickly. Hence, a queue length detector 114 monitoring the length of the delay queue 108 may be used to give a good indication of whether a process is acting like a virus. If the length of the delay queue 108 reaches a threshold, the offending process may be halted, either by stopping networking or by suspending the process itself. A user or administrator can then be contacted.

SUMMARY

One embodiment of the invention relates to a network device that includes at least one port to connect to a network and at least one throttle that limits a rate of connections made from the device. An auto-adaptive thresholding mechanism determines a threshold for the throttle.

Another embodiment of the invention relates to a network apparatus including multiple ports capable of making connections and multiple throttle instantiations. Each throttle instantiation is associated with a port or group of ports. Threshold levels for each throttle instantiation are independently set. The ports may be physical ports or may be logical ports.

Another embodiment relates to a method of determining threshold levels for a virus/worm throttle on a network device. The threshold levels are set at initial values. During an adaptive period, the device is operated while allowing the threshold levels to increase to worst-case sizes. After the adaptive period, the threshold levels are reduced for operation going forward.

Another embodiment relates to a method of dynamically determining threshold levels for a virus/worm throttle on a network device. The threshold levels are set at initial values. The device is operated while monitoring connection behavior of the device, and the threshold levels are adjusted based on the observed connection behavior.

Another embodiment relates to a method of protecting a network from wide spread of a virus or worm. The method includes configuration of at least one network infrastructure device with multiple virus/worm throttle instantiations. Each throttle instantiation may correspond to a physical port or may correspond to a protocol or logical port.

DETAILED DESCRIPTION

As described above, the virus throttle algorithm of the HP Labs report operates on a premise of limiting the number of new connections to unique IP (Internet Protocol) addresses. That is, a nominally operating network host does not spawn more than a few new connections in a short period of time to previously non-contacted hosts. An infected host will typically attempt many hundreds, if not thousands, of new connections to previously non-contacted hosts during a short period of time in an attempt to spread its infection as quickly as possible. This theorem of virus/worm behavior forms the basis of the throttling mechanism. If a host attempts too many new connections to previously non-contacted hosts in a short amount of time, the system will throttle down the rate of those new connections.

Figure 1:
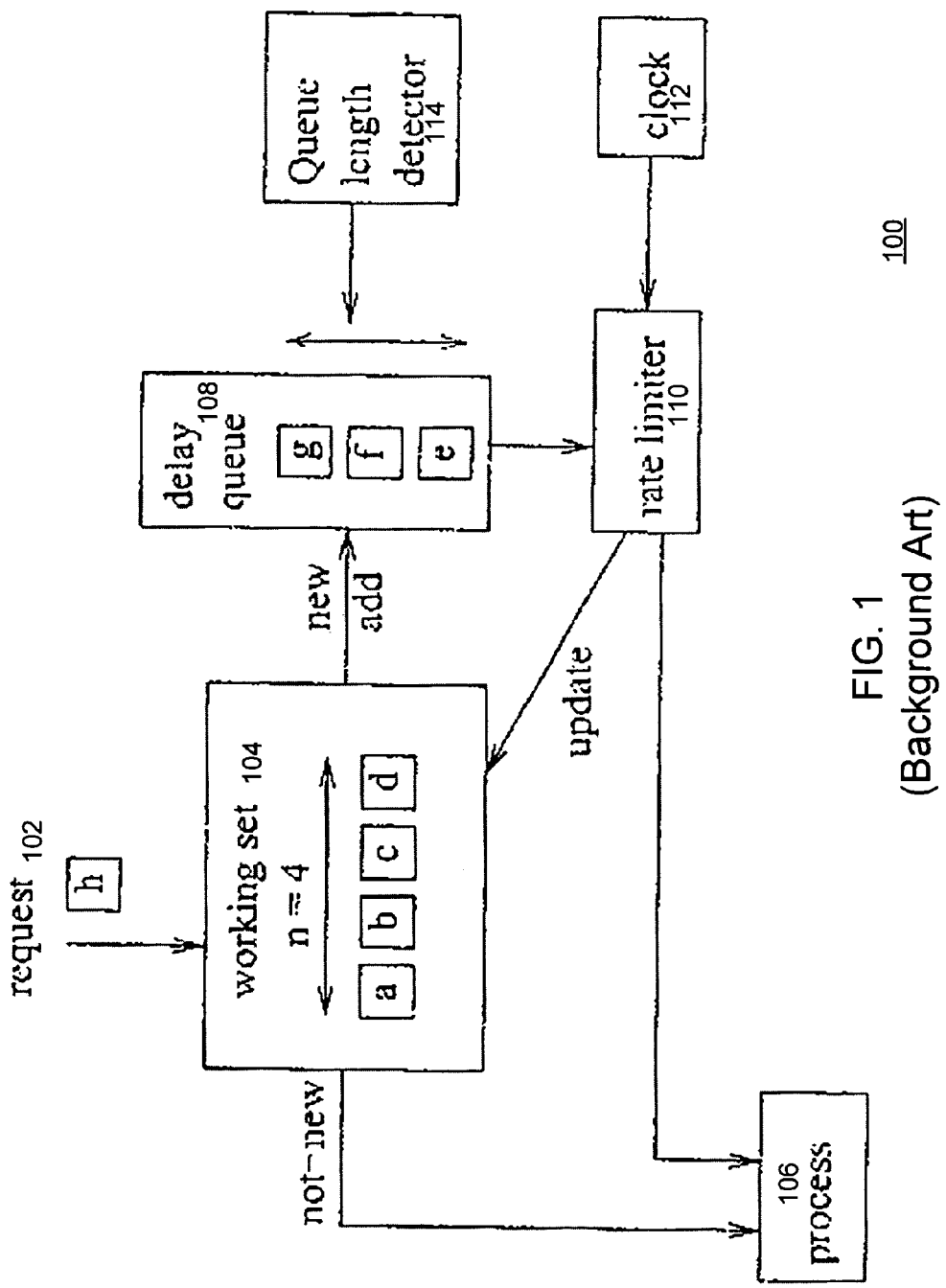
FIG. 1 is a schematic diagram depicting basic components of a virus throttle.

The working set forms the collection of IP addresses that a host may communicate at that particular instant in time without delay. The delay queue forms the collection of connection requests that are being delayed because they are to IP addresses which are not part of the working set. The throttle architecture diagram in FIG. 1 shows an example wherein four IP addresses are in the working set, corresponding to a full working set, and three connections are being throttled in the delay queue because of the full working set condition. At regular intervals, the oldest element in the working set is purged, and the oldest element in the delay queue is transferred to the working set, at which point the connection to the remote host is allowed. The two primary means of manipulating the behavior are by setting the sizes of the working set and of the delay queue.

The HP Labs report describes the implementation of the virus throttle on a network host, such as a desktop computer, laptop computer, or network server. The HP Lab report discusses findings pertaining to observed throttle-related behavior for various network protocols and good values for working set and delay queue sizes. However, network protocol behavior does not necessarily lend itself easy characterization, especially in an actual user environment that may be quite different than a lab environment.

Furthermore, a method involving static configuration of working set and delay queue sizes does not extrapolate well into an implementation of the virus throttle algorithm on a network infrastructure device, such as a switch or router. This is because devices connected to network infrastructure ports are not consistent with respect to frequency or number of connections established to other devices. A network infrastructure device typically includes many physical or logical port interfaces. Each physical or logical port may connect to other infrastructure devices or to end hosts.

In order to protect a network or portion thereof, the present application discloses a network infrastructure device configured so as to be protected by multiple instantiations of a virus/worm throttle. In one embodiment, the virus/worm throttle is advantageously configured to self-configure (or self-tune or auto-adapt) its thresholds pertaining to the detection of abnormal events. The self-configuration mechanisms are based on a reasonable assumption that, under normal network conditions, a consistent pattern develops that can be attributed to what is normal for a particular port.

Two auto-adaptive mechanisms are described below in relation to FIGS. 2 and 3. However, alternative auto-adaptive mechanisms may also be employable in accordance with the spirit of the invention.

One aspect of the mechanisms involves the detection of new connections on the network infrastructure device (in other words, detecting actions of hosts attempting to contact a previously non-contacted host). This detection may be performed using hardware or sampling detection. In a preferred embodiment, hardware detection circuitry may be configured to provide this detection without significant performance degradation. In an alternate embodiment, the packets may be sampled, wherein the sample rate used is consistent with the accuracy required to set an appropriate threshold.

Figure 2:
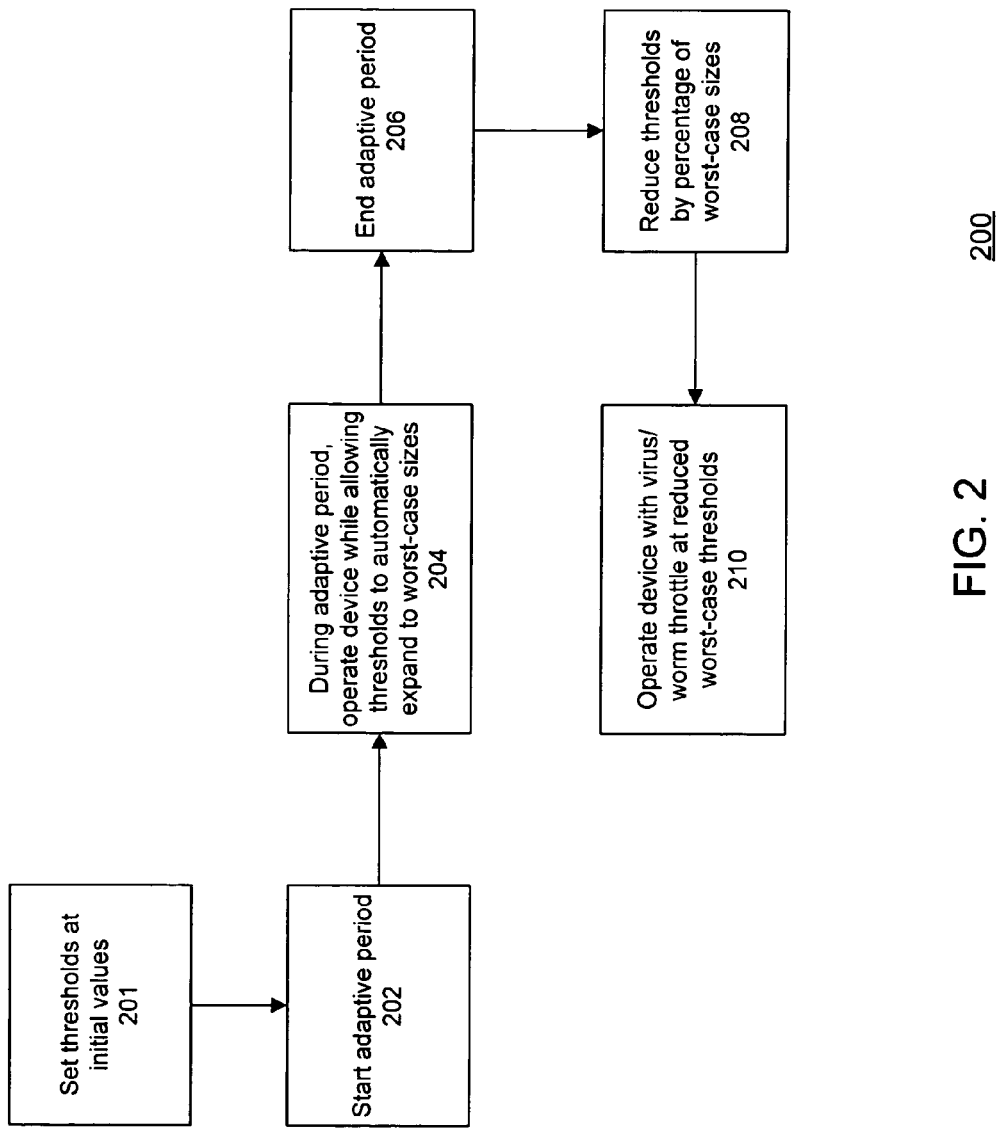
FIG. 2 is a flow chart depicting a method of auto-adaptive thresholding for virus/worm throttling in accordance with an embodiment of the invention.

FIG. 2 is a flow chart depicting a method of auto-adaptive thresholding 200 for virus/worm throttling in accordance with an embodiment of the invention. In one embodiment, the working set and delay queue threshold settings are initially set 201 to zero size values. The allowed rate (as determined, for example, by the clock and rate limiter) may be pre-set at a constant value, or alternatively, also be considered as a variable throttle setting. Over the course of a pre-determined set of time (i.e., from the start 202 to the end 206 of the adaptive period), the throttle settings are allowed 204 to automatically expand to worst-case sizes. This pre-determined set of time comprises, for example, a period of working day or several hours upon boot-up or initiation of the network device.

Upon completion of the adaptive time period, the worst-case throttle settings are reduced 208 by a percentage of their original sizes. Thereafter, the device is operated 210 with the virus/worm throttle at the reduced worst-case thresholds. In one example, the percentage reduction may be set to be 50%. In other examples, the percentage reduction may be increased to lower the thresholds, or decreased to raise the thresholds. For example, no reduction (or an increase) would serve to decrease the "sensitivity" for more conservative throttling. On the other hand, an 80% percentage reduction would serve to increase the sensitivity for more aggressive throttling. The less the sensitivity (i.e. the more conservative the throttling), the less likely a false positive indication of an infection would occur (though the more likely that a false negative indication of an infection would occur). The greater the sensitivity (i.e. the more aggressive the throttling), the less likely a false negative indication of an infection would occur (though the more likely that a false positive indication of an infection would occur).

This percentage-reduction of worst-case model for threshold determination is based on the ability to determine the worst-case threshold settings necessary to allow unimpeded nominal network usage. The worst-case threshold settings referring to the largest working set and the largest delay queue sizes.

Figure 3:
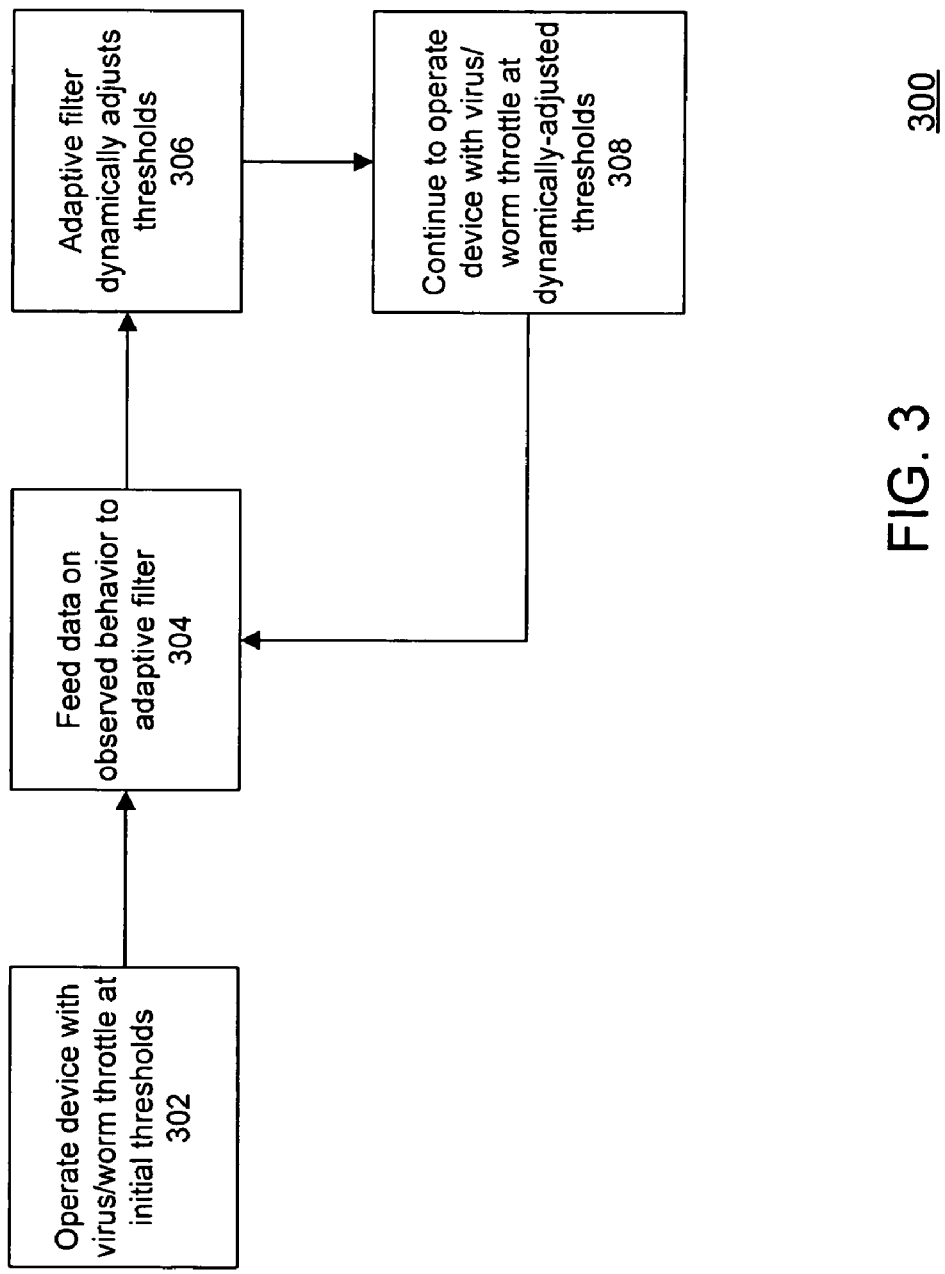
FIG. 3 is a flow chart depicting a method of dynamic auto-adaptive thresholding for virus/worm throttling in accordance with an embodiment of the invention.

FIG. 3 is a flow chart depicting a method of dynamic auto-adaptive thresholding 300 for virus/worm throttling in accordance with an embodiment of the invention. In this method 300, initial thresholds may be pre-set or set using the method 200 of FIG. 2. The network device is operated 302 with the virus/worm throttle at the initial threshold settings.

During the operation of the network device, its behavior is observed and data on the observed behavior is fed 304 to an adaptive filter. Based on this input, the throttle threshold settings are dynamically adjusted 306 by the adaptive filter. The network device continues to operate 308 with the threshold settings at the dynamically-adjusted thresholds based on the observed behavior data.

In one embodiment, the adaptive filter may comprise a Kalman filter. In other embodiments, other adaptive filters may be used. A Kalman filter is a linear, model-based, stochastic, recursive, weighted least-squares estimator. A Kalman filter estimates the state of a system, or part of it, based on the system inputs and outputs. Kalman filters may be applied to model non-linear systems with good accuracy. As such, a Kalman filter is advantageously configurable so as to calculate threshold settings in a manner that takes into account natural network variance over time. The usage of a Kalman filter allows the threshold settings to be dynamically varied over time, while at the same time being able to detect abnormal behavior. Such abnormal behavior is detected due to a large variance from the expected connection behavior calculated by the filter.

In accordance with an embodiment of the invention, the adaptive filtering may be tunable or adjustable so as to be more aggressive or more conservative with respect to the throttling performed. As discussed above, more aggressive throttling leads to less likely false negative detections (but more likely false positive detections), while more conservative throttling leads to less likely false positive detections (but more likely false negative detections).

Figure 4:
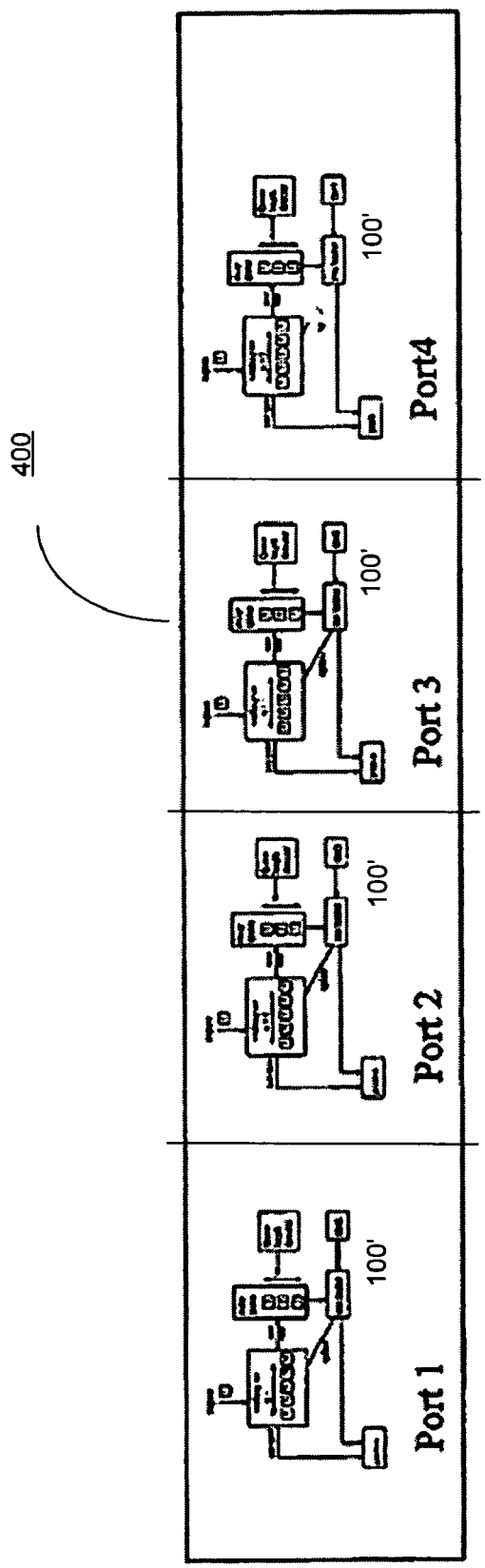
FIG. 4 is a schematic diagram depicting a network infrastructure apparatus with instances of the virus/worm throttle implemented per physical node in accordance with an embodiment of the invention.

FIG. 4 is a schematic diagram depicting a network infrastructure apparatus 400 with instances of the virus/worm throttle 100' implemented per physical node in accordance with an embodiment of the invention. The apparatus 400 is shown has having four physical ports 402 (such as a four-port switch), but more or fewer ports 402 may be implemented on the apparatus 400.

As shown in FIG. 4, a separate instantiation of the virus/worm throttle 100' may be implemented per physical port 402. In particular, the throttles 100' may be implemented on the ingress data paths for the ports 402. Each instantiation of the virus throttle 100' operates independently of each other. Before switching and forwarding of traffic is allowed, the instance of the throttle 100' on the ingress port makes a forward or delay decision. This advantageously provides a separately controllable throttle for each physical port 402. As such, every port 402 of the network infrastructure apparatus 400 becomes separately "inoculated" against the quick spread of viruses or worms.

In one specific embodiment, the instance of the virus throttle 100' on each physical port implements a percentage-reduction worst-case mechanism, as discussed above in relation to FIG. 2, for determining the threshold settings for that port. In another specific embodiment, the instance of the virus throttle 100' on each physical port implements a dynamic adaptive-filtering mechanism, as discussed above in relation to FIG. 3, for determining the threshold settings for that port.

In accordance with another embodiment, the physical ports may default to thresholds set by an auto-adaptive mechanism. However, the end-user may override the default and specify set thresholds. For example, this may be desirable for physical ports linking two infrastructure devices, where a higher connection frequency may be expected than for a port linking to a normal end-client host.

An aspect of the invention relating to false-positive and/or false-negative remediation is now discussed. The HP Labs report describes its algorithm in the context of applying it at the host interface level, where just one set of threshold settings are active at any given point for all egress traffic on the interface. However, threshold settings that work well for one application are often not good for another application. This leads to a disadvantageous reduction of throttle effectiveness because one set of threshold settings is chosen that has "minimally sufficient" settings for all the pertinent applications and protocols. In some instances, no such minimally sufficient threshold settings exist that can be successfully applied to all egress traffic at the host interface level. In those instances, increased occurrence of false-positive and/or false-negative results is to be expected. A false-positive result would be the incorrect detection of a virus or worm based on the egress traffic. A false-negative result would be a virus or worm whose egress-related behavior escaped detection.

Figure 5:
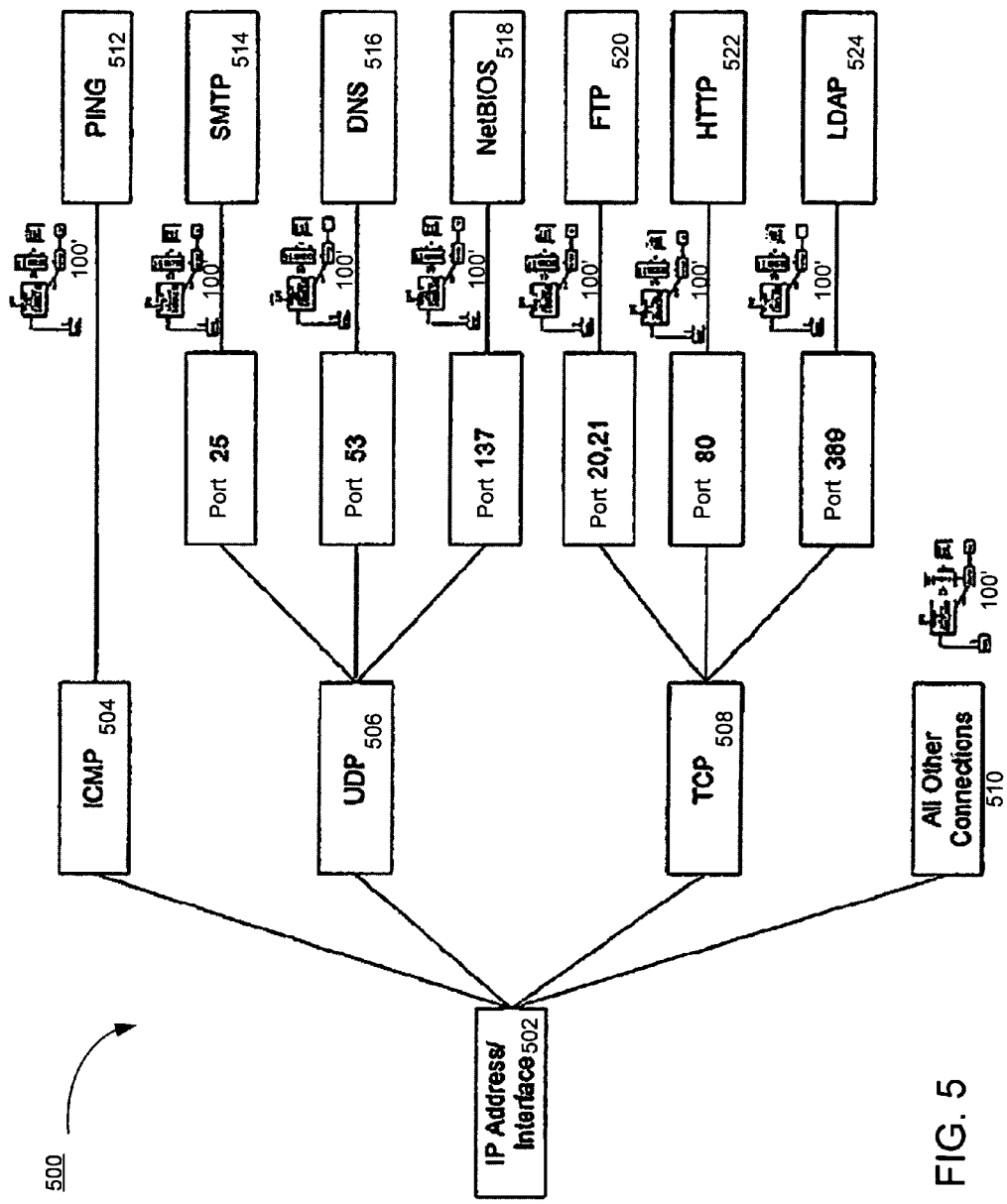
FIG. 5 is a schematic diagram depicting a network infrastructure apparatus with instances of a virus/worm throttle implemented per logical node in accordance with an embodiment of the invention.

The apparatus 500 of FIG. 5 overcomes these issues relating to minimally sufficient threshold settings by advantageously providing stratification in the form of creating multiple instances of the throttle algorithm, where each instance operates independently at a different protocol and/or network port level.

FIG. 5 is a schematic diagram depicting a network infrastructure apparatus 500 with instances of a virus/worm throttle 100' implemented per logical port in accordance with an embodiment of the invention. As shown in FIG. 5, the IP address interface 502 of the network device receives requests under different connection protocols, including ICMP 504, UDP 506, TCP 508, and a catch-all category of other connection protocols 510.

Each connection protocol may include different types of communications. For example, as shown in FIG. 5, ICMP 504 includes "ping" messages 512 (and other types of messages). As another example, UDP 506 communications may specify logical port number 25 corresponding to SMTP messages 514, or logical port 53 corresponding to DNS messages 516, or logical port 137 corresponding to NetBIOS messages 518. As another example, TCP communications 508 may specify logical port 20 or 21 corresponding to FTP messages 520, or port 80 corresponding to HTTP messages 522, or logical port 389 corresponding to LDAP messages 524. The above logical ports and message types are described above as examples. Many other message types exist, and the port numbers corresponding thereto may be changed from their default values.

As shown in FIG. 5, a separate instantiation of the virus/worm throttle 100' may be implemented per logical port. In one specific embodiment, the instance of the virus throttle 100' covering each logical port implements a percentage-reduction worst-case mechanism, as discussed above in relation to FIG. 2, for determining the threshold settings for that port. In another specific embodiment, the instance of the virus throttle 100' covering each logical port implements a dynamic adaptive-filtering mechanism, as discussed above in relation to FIG. 3, for determining the threshold settings for that port. In accordance with another embodiment, end-users may specify whether an auto-adaptive mechanism is used to set thresholds for a specific logical port or whether the thresholds are set manually for that port.

The diagram of FIG. 5 shows eight independent instances of the virus throttle algorithm running concurrently. Seven of the eight instances are servicing specific protocols and network port numbers of particular interest for this interface. By providing separate instantiations of the throttle algorithm, each with its own threshold settings, fine-tuning of the throttle performance is enabled, such that each throttle algorithm instance may be tuned or customized to a particular application. The number of instances may be increased or decreased by user configuration of the apparatus.

On a network infrastructure device, each physical (or logical) port may implement a group of throttle instances as discussed above in relation to FIG. 5. Hence, the network infrastructure device with a number of ports may implement a corresponding number groups of throttle instances.

If widely applied, an embodiment of the present invention would result in a network fabric that is "mass-inoculated" against viruses and worms. Such an inoculated network fabric would no longer be dependent on end hosts to implement the throttle algorithm (or other forms of antivirus software). Infected (rogue) hosts would be stopped before they were able to widely spread the virus/worm.

An embodiment of the present invention advantageously enables more accurate administration of the virus-throttling algorithm. For ports with historically low connection rates, less aggressive threshold setting may be used to allow the algorithm to begin throttling earlier, thus slowing the potential for a virus to spread. For ports with historically high connection rates, more aggressive threshold settings may be used to make it less likely to throttle "normal" traffic, thus providing less interference with network performance. In other words, by stratifying the throttle algorithm to operate on separate network streams, fine granularity of sensitivity and adjustment is provided to tailor the throttle to a specific network environment. Advantageously, the likelihood of false-positives and false-negatives may be so reduced.

Another advantage is that the need for most, if not all, hosts to implement the algorithm is eliminated. Rogue hosts that attach to the protected network fabric will be squelched if they exceed the connection thresholds. Yet another advantage relates to the simplification of network administration. The need for customers to maintain precise information on network topology and port-to-device mapping is avoided.

In regards to another embodiment, the user is also relieved from needing to characterize each port's normal connection establishment rate. Instead, the throttle may self-adjust to nominal network conditions. This self-adjustment may be implemented regardless of whether the algorithm is applied within a network host or at a network infrastructure device).

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A network device, the device comprising:
   at least one port to connect to a network;
   at least one throttle to limit a rate of connections made from the device; and
   an auto-adaptive thresholding mechanism to adjust a threshold for the throttle during an adaptive period, including to expand the threshold for the throttle from an initial value at a start of the adaptive period to a maximum value at an end of the adaptive period.

2. The network device of claim 1, wherein the auto-adaptive thresholding mechanism is to monitor connections made by the network device during the adaptive period.

3. The network device of claim 1, wherein, after the adaptive period, the auto-adaptive thresholding mechanism is to reduce the expanded threshold by a predetermined amount to set the threshold going forward.

4. The network device of claim 1, wherein the auto-adaptive thresholding mechanism is to:
   observe connection-making behavior including initiations of connections over the network by the network device; and
   dynamically adjust the threshold based on the observed connection-making behavior.

5. A network apparatus, the apparatus comprising:
   multiple ports to make connections over a network; and
   multiple throttle instantiations, each of the throttle instantiations associated with a corresponding port or group of ports from among the multiple ports, wherein the multiple throttle instantiations are associated with corresponding independently set threshold levels that control communication of traffic by the corresponding ports over the network, and
   an auto-adaptive thresholding mechanism to independently adjust each of the threshold levels of the multiple throttle instantiations, including to expand each of the threshold levels from an initial value at a start of an adaptive period to a maximum value at an end of the adaptive period.

6. The apparatus of claim 5, wherein the auto-adaptive thresholding mechanism is to adjust at least one threshold level for a particular one of the throttle instantiations based on monitoring data communication of a corresponding one of the multiple ports over the network.

7. A method of determining threshold levels for a virus/worm throttle on a network device, the method comprising:

setting the threshold levels at initial values;
during an adaptive period, allowing the threshold levels to increase based upon a number of new connections made by the network device to external devices that were not previously connected with the network device prior to the adaptive period; and
after the adaptive period, reducing the threshold levels for operation going forward.

8. A method of dynamically determining at least one threshold level for a virus/worm throttle on a network device, the method comprising:
setting the at least one threshold level at an initial value, wherein the at least one threshold level affects the throttle in limiting a rate of connections initiated by the network device;
operating the network device while monitoring connection behavior of the network device; and
adjusting, by the network device, the at least one threshold level based on the monitored connection behavior, including expanding the threshold level during an adaptive period and reducing the expanded threshold level by a predetermined amount after the adaptive period.

9. The method of claim 8, further comprising using a tunable filter to monitor the connection behavior and adjust the at least one threshold level.

10. A method of protecting a network from spread of a virus or worm, the method comprising:
using a network device, establishing a plurality of connections from the network device to external devices during a time period;
as a result of the establishing, determining a threshold for a throttle to limit a rate of connections from the network device to the external devices, including expanding the threshold from an initial value to a maximum value during the time period;
after the time period and the determining, monitoring the threshold with respect to a number of new connections made by the network device to external devices not connected with the network device in an amount of time immediately prior to the monitoring; and
limiting the rate of connections made by the network device as a result of the monitoring determining that the number of the new connections made by the network device exceeds the reduced threshold.

11. The network device of claim 1, further comprising circuitry to use the threshold to determine whether a virus/worm is present within the network device.

12. The network device of claim 11, wherein the circuitry is to compare the threshold with a number of new connections of the network device with respect to external devices not connected with the network device in an amount of time immediately prior to the comparison to determine whether the virus/worm is present within the network device.

13. The network device of claim 12, wherein the at least one throttle is to limit the rate of connections made from the network device as a result of the comparison by the circuitry determining that the number of new connections made by the network device exceeded the threshold and the virus/worm is present in the network device.

14. The network device of claim 11, wherein the auto-adaptive thresholding mechanism is to determine the threshold corresponding to a size of a working set which comprises a number of recent connections of the network device with external devices.

15. The network device of claim 1, wherein the auto-adaptive thresholding mechanism is to adjust the threshold corresponding to a size of a delay queue which comprises a plurality of requests to establish a plurality of new connections from the network device to external devices not connected with the network device in a preceding time period.

16. The apparatus of claim 5, wherein the throttle instantiations are to limit a rate of connections made by respective ones of the ports or groups of ports to external devices.

17. The apparatus of claim 16, wherein the threshold levels control when the throttle instantiations limit the rate of the connections.

18. The apparatus of claim 17, wherein the throttle instantiations are individually configured to limit the rate of the connections made by the respective one of the ports or groups of ports to external devices as a result of a number of new connections made by the respective ones of the ports or groups of ports exceeding respective ones of the threshold levels.

19. The method of claim 7, wherein the setting comprises setting the threshold levels which are used during operation of the network device to determine if a virus/worm is present within the network device and reducing a rate of connections of the network device to external devices.

20. The method of claim 7, wherein the setting comprises setting at least one of the threshold levels corresponding to a number of new connections made by the network device to external devices not connected with the network device in an amount of time immediately prior to the setting.

21. The method of claim 7, wherein the reducing comprises reducing according to criteria independent of operations of the network device.

22. The method of claim 8, wherein the monitoring the connection behavior comprises monitoring a number of new connections initiated by the network device to external devices not connected with the network device in an amount of time immediately prior to the monitoring.

23. The method of claim 8, wherein the setting comprises setting at least one of the threshold levels corresponding to a number of new connections made by the network device to external devices not connected with the network device in an amount of time immediately prior to the monitoring to detect a presence of a virus/worm in the network device.

24. The network device of claim 1, wherein the at least one throttle is to limit the rate of connections initiated by the network device.

25. The method of claim 10 wherein the limiting the rate of connections comprises limiting the rate of new connections which are initiated by the network device.

26. The network device of claim 1, wherein the auto-adaptive thresholding mechanism includes a hardware detection circuit to detect new connections initiated by the network device over the network.

27. The network apparatus of claim 6, wherein the auto-adaptive thresholding mechanism includes a hardware detection circuit to detect new connections initiated by the network apparatus over the network.

28. The network device of claim 1, wherein the auto-adaptive thresholding mechanism is configured to automatically adjust the threshold based on monitoring data communication of the network device over the network.

29. The method of claim 8, further comprising using the threshold levels to limit a rate of connections initiated by the network device.

30. The method of claim 10, wherein the determining the threshold comprises adjusting the threshold based on monitoring data communication of the network device over the network.

* * * * *